Patented July 9, 1940

2,207,686

UNITED STATES PATENT OFFICE 2,207,686

POLYMERIZING DRYING OILS

Alexander Schwarcman, Buffalo, N. Y., assignor to Spencer Kellogg and Sons, Inc., Buffalo, N. Y., a corporation of New York No Drawing. Application December 19, 1938, Serial No. 246,761

17 Claims. (Cl. 260—407)

This invention or discovery relates to polymerizing drying oils; and it comprises an improvement in methods of polymerizing fatty oils, and particularly drying oils, such as linseed oil, by heating to temperatures of the order of 500° to 600° F., wherein polymerization is accelerated by the presence of a minute amount of an oxidation product of a phenanthrene-like hydrocarbon, advantageously an oxidation product of retene, which acts as a catalyst; and it comprises, as a new article of commerce, a fatty oil adapted for quick bodying when heated and containing a small amount of an oxidized aromatic hydrocarbon of the phenanthrene type, advantageously oxidized retene, adapted to catalyze polymerization of the oil; all as more fully hereinafter set forth and as claimed.

Fatty oils are often thickened or "bodied" to make them better adapted for special purposes by heating to a high temperature. The resulting internal re-arrangement is often called polymerization, and it increases the viscosity and the density of the oil. The degree to which bodying is carried depends on the purpose for which the oil is to be used, and is generally a function of the time and temperature of heating.

For example, it is common to body linseed oil, as well as other drying oils such as Perilla oil, soy bean oil, fish oil, etc., prior to their use in varnishes, enamels, paints, printing inks, linoleum, and similar products. In making commercial stand oil from linseed oil, the temperature applied is generally of the order of 500° to 600° F., and the time of heating may be as much as eight hours, or even more.

In all cases, heating of fatty oils tends to darken the oil and increase its acidity. For example, in making stand oil from neutral linseed oil, an acidity of 18 or 20 may develop. It is therefore a desideratum to provide a catalyst which will not change the usual characteristics of the oil, but will make it possible to effect the desired bodying in a shorter time, thereby lessening darkening or discoloration and the development of acidity.

The requirements of a satisfactory catalyst for this purpose are, however, quite severe. The catalyst must have enough activity at bodying temperatures to substantially shorten the time of heating, but it must generally have no other effect; and it must be a substance which can be used in such small amounts that its presence in the oil has no substantial detrimental effect on the usual properties of the oil. When the oil is once bodied, the catalyst cannot be removed by any economical procedure, and it must therefore be of such a nature that, if retained in the oil, it will not darken pigments, or keep on reacting in the finished product to cause "livering" or darkening of paint, or development of bloom, etc.

I have found that the products of oxidizing certain aromatic hydrocarbons of relatively high molecular weight meet these requirements, and are effective in minute amounts. The hydrocarbon bases which I find particularly suitable for this purpose are members of the phenanthrene series, and phenanthrene itself is a suitable starting material. This compound has the empirical formula $C_{14}H_{10}$, and is usually designated structurally as $C_6H_4.CH$
$C_6H_4.CH$ A characteristic of this compound is that the two CH-groups form a new hexagon ring with the carbon atoms of the two benzene nuclei to which they are linked, and phenanthrene may therefore be considered the product of the coalition of three benzene nuclei, or of one naphthalene nucleus and one benzene nucleus. The CH-groups are readily oxidized to hydroxy and ketonic groups, thus forming suitable catalysts for my purpose.

Several complex hydrocarbons having a structure similar to that of phenanthrene have been isolated, and, for convenience, will be designated hereinbelow as "phenanthrene-like" hydrocarbons. Among these are

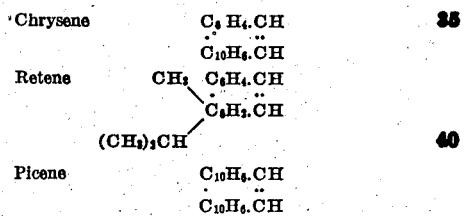

All of these hydrocarbons occur in coal tar, and may be obtained from crude "anthracene oil," the fraction boiling above 270° C., advantageously after removal of the anthracene therefrom. Whether obtained from this source or elsewhere, they may be recovered in relatively pure form by crystallization, if desired. In general, they are readily oxidized to form ketones, hydroxy compounds, and mixed oxidation products, which are suitable catalysts for my purpose.

Whether using phenanthrene itself, or a phenanthrene-like compound such as retene for example, it is apparently immaterial whether the oxidation converts one or more of the CH-groups into hydroxy groups, or ketonic groups. In any case, the oxidized product is a very powerful catalyst for the polymerization of drying oils and other polymerizable fatty oils. The most effective catalyst seems to be the oxidation product of retene, which is also called methyl isopropyl phenanthrene. Oxidation of this and other phenanthrene-like hydrocarbons may theoretically proceed to the formation of di-ketones or quinones, such as retene quinone, but it is not necessary to carry the oxidation to that point in order to obtain an effective catalyst. Less highly oxidized compounds, and the mixed oxidation products which are generally obtained, are quite satisfactory for my purpose. It is not necessary that oxidation go to this theoretical limit or that highly pure material be used. In fact, the mixed products are usually advantageous.

All of the oxidation products of phenanthrene-like hydrocarbons are effective in amounts less than 0.5 per cent on the oil treated, and the oxidation product of retene is in amounts as low as 0.05 per cent on the oil. These minute amounts of my catalyst reduce the time required for polymerization at a given temperature by nearly 50 per cent. For example, a linseed oil which normally requires heating for five and one-half to six hours at a temperature of 550° to 600° F. to reach a consistency of 6–Z on the well-known Gardner-Holdt scale, will reach the same consistency upon heating to the same temperature for about three hours in the presence of 0.05 to 0.1 per cent of oxidized retene.

The complex phenanthrene-like hydrocarbons which are suitable starting materials for the preparation of my catalyst are characterized by the group $$\begin{array}{c} R.CH \\ R'.CH \end{array}$$

wherein R and R' are aromatic nuclei which may be the same or different, and which may or may not have side chains or substituent groups. Hydrocarbons of this type may be used in commercially pure or technical grades, if desired—for example, commercially pure retene. Mixtures of hydrocarbons of this type are also suitable for my purpose and are generally more readily available. For example, I may use the mixtures of these hydrocarbons which are recoverable from the washings of crude anthracene. Certain diluents and impurities in the starting material are also permissible. The active ingredient of my catalyst is believed to be the oxidation product of the specified phenanthrene-like hydrocarbons, however, and when impure materials are used, the amount of catalyst required is correspondingly increased.

The selected starting material, advantageously retene, may be oxidized in any desired manner, as by heating with peroxides or chromic acid or dichromates, for example. Oxidation is facilitated by dissolving or suspending the hydrocarbons in a suitable liquid medium. After completion of the oxidation, the oxidized product may be, as noted, a hydroxy compound, or a ketone, or a diketone, or a mixture of oxidized compounds. It is advantageously separated from the liquid and added to the oil alone, but in some instances it may be added to the oil to be polymerized along with any liquid in which it is dispersed. In the latter case, the solvent is eliminated during the polymerization of the oil.

The above described procedure, in which retene or some other phenanthrene-like hydrocarbon is oxidized and the resulting oxidized compound is added as a catalyst to the oil to be polymerized, gives excellent results. I have also found, however, that good results can be obtained by dissolving one of these phenanthrene-like hydrocarbons directly in the oil to be polymerized, and then adding to the oil an organic oxidizing agent such as benzoyl peroxide. The oxidation products are formed, so to speak, in situ. It appears that when the oil thus prepared is heated, as during polymerization, nascent oxygen given up by the benzoyl peroxide, etc., oxidizes the phenanthrene-like compound and produces a catalyst similar to that obtained by the separate oxidation treatment previously described. This modified procedure has certain commercial advantages, but it tends to darken the oil more than the addition of pre-formed catalyst. For many purposes where color of the oil is of no importance, however, an oil produced by this procedure is suitable and economical. The process is cheaper.

An advantageous result of the employment of oxidized phenanthrene-like hydrocarbons as catalysts for the polymerization of fatty oils, and particularly drying oils, is that these catalysts do not lead to discoloration of the oil on heating, and they have no deleterious effect on the finished oils. Even sensitive pigments, including white lead, are not darkened by the oil polymerized in accordance with this invention. Also, the catalysts of my present invention do not cause fluorescence of the polymerized oil, which results when some organic compounds are employed as catalysts of polymerization, and which is objectionable.

The most desirable commercial product of my invention is a drying oil such as linseed oil, or soy bean oil, containing from .05 to .1 per cent of oxidized retene. Such an oil is ready for bodying to the desired extent by the user, and may be subjected to any desired bodying or polymerizing treatment. Due to the presence of my catalyst, the time of heating required to obtain the desired consistency at any given temperature is decreased approximately 50 per cent. It is noteworthy that this improvement is effected with no accompanying objectionable results.

Similar benefits are obtained when employing other oxidized phenanthrene-like hydrocarbons having the characteristic structure $$\begin{array}{c} R.CH \\ R'.CH \end{array}$$

including phenanthrene itself, but somewhat larger quantities of these catalysts than of retene, up to 0.5 per cent, for example, may be required to obtain the desired result. With all of these catalysts, however, it is possible to produce commercial unbodied oils capable of quick bodying at any time this may be wanted.

When some of these oxidized phenanthrene-like hydrocarbons are added to very light colored oils, there is a tendency for the catalyst to tint or or discolor the oil to such a degree that subsequent heating, even at high temperatures, does not bleach the oil sufficiently. This difficulty is especially likely to be encountered when the catalyst employed is an impure product or a mixed product. The resultant discoloration is a disadvantage when the finished oil is to be used in white enamel, for example.

This difficulty can be readily overcome, however, by a slight modification of the usual treatment of the oil prior to marketing. It is the general practice to prepare high grade oils, such as linseed oil, by washing with an alkali to remove free acids and subsequent bleaching of the neutralized oil with fuller's earth, carbon black or some other adsorbent decolorizing material. In my modified process the oil is first neutralized with alkali, and the resulting soap is removed as usual. The oxidized phenanthrene-like hydrocarbon is then added to the neutralized oil to catalyze its polymerization, and the solution of catalyst in the oil is then bleached by contact with the required quantity of fuller's earth or carbon black or other suitable adsorbent. The step of adding the catalyst is intercalated between the usual neutralization and the usual earth treatment. This yields a product of very light color, which bleaches out nearly water white upon heating to high temperatures during subsequent polymerization. It is notable that this result is obtained without diminishing the catalytic effect of the oxidized phenanthrene-like hydrocarbon. My catalyst is not removed from the oil by contact with adsorbents. Tests indicate, however, that it largely disappears during the actual polymerization treatment. The bodied oil is substantially identical chemically and physically with that obtained in the usual long time bodying without a catalyst.

What I claim is:

1. As a new composition, a fatty oil containing a minor amount of an oxidized hydrocarbon capable of catalyzing the polymerization of said oil, the said hydrocarbon having the general formula

wherein R and R' are aromatic nuclei.

2. The composition of claim 1, wherein the fatty oil is a drying oil.

3. The composition of claim 1, wherein the fatty oil is linseed oil.

4. The composition of claim 1, wherein the said oxidized hydrocarbon is present in an amount less than 0.5 per cent by weight on the oil.

5. The composition of claim 1, wherein the oxidized hydrocarbon is oxidized retene.

6. The composition of claim 1, wherein oxidized retene is present in an amount on the order of 0.05 to 0.1 per cent on the oil.

7. The method of polymerizing fatty oils which comprises adding to a fatty oil capable of polymerization a minor amount of an oxidized hydrocarbon, said hydrocarbon having the general formula

wherein R and R' are aromatic nuclei, and heating the mixture to a temperature of 500° to 600° F.

8. The method of claim 7, wherein the oil comprises linseed oil.

9. The method of claim 7, wherein the oxidized hydrocarbon is oxidized retene.

10. A drying oil containing 0.05 pepr cent to 0.5 per cent by weight of an oxidized hydrocarbon having the composition

wherein R and R' are aromatic nuclei.

11. The drying oil of claim 10, wherein the oxidized hydrocarbon is oxidized retene.

12. A drying oil containing a minor amount of a hydrocarbon having the general formula

wherein R and R' are aromatic nuclei and an organic oxidizing agent adapted to react with said hydrocarbon at elevated temperatures to produce a catalyst for polymerization of the said oil.

13. The composition of claim 12, wherein said organic oxidizing agent is benzoyl peroxide.

14. The method of preparing a light-colored, rapidly polymerizing fatty oil, which comprises adding to a polymerizable fatty oil an oxidized hydrocarbon adapted to catalyze polymerization of the oil, and contacting the oil and catalyst with an adsorbent to remove coloring matter therefrom, the said hydrocarbon having the general formula

wherein R and R' are aromatic nuclei.

15. The method of claim 14, wherein the oil is neutralized with alkali before addition of the catalyst thereto.

16. In the ordinary process of making bodied or polymerized fatty oils wherein the oil is first treated to remove free fatty acids, is then bleached with earthy material and finally heated to a high temperature to produce polymerization, the improvement which comprises adding to the oil a minute proportion of oxidization products of a hydrocarbon after treatment to remove acids and before the bleaching, the said hydrocarbon having the formula

wherein R and R' are aromatic nuclei.

17. In the ordinary process of making bodied or polymerized fatty oils wherein the oil is first treated to remove free fatty acids, is then bleached with earthy material and finally heated to a high temperature to produce polymerization and give bodied oil, the improvement which comprises accelerating the bodying by performing the heating in the presence of a minute proportion of oxidation products of retene.

ALEXANDER SCHWARCMAN.